United States Patent
Hamilton et al.

(10) Patent No.: US 7,533,235 B1
(45) Date of Patent: May 12, 2009

(54) RESERVE STACKING

(75) Inventors: Eric C. Hamilton, Durham, NC (US); John K. Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 355 days.

(21) Appl. No.: 11/242,805

(22) Filed: Oct. 3, 2005

(51) Int. Cl.
*G06F 12/00* (2006.01)

(52) U.S. Cl. .................. 711/170; 711/4; 711/100; 711/104; 711/105; 711/114; 711/117; 711/171; 711/172; 711/173; 707/100; 707/103 X; 719/312; 719/313; 709/213; 709/214; 709/215; 709/216

(58) Field of Classification Search .............. 711/4, 711/100, 104–105, 114, 117, 170–173; 709/213–216; 707/100, 103 X; 719/312, 313
See application file for complete search history.

(56) References Cited

U.S. PATENT DOCUMENTS

| 5,457,793 | A | 10/1995 | Elko et al. |
|---|---|---|---|
| 5,461,712 | A | 10/1995 | Chelstowski et al. |
| 5,560,003 | A | 9/1996 | Nilsen et al. |
| 5,606,689 | A | 2/1997 | Nakagawa |
| 5,634,096 | A | 5/1997 | Baylor et al. |
| 6,862,661 | B2 | 3/2005 | Riedle et al. |
| 6,983,303 | B2 | 1/2006 | Pellegrino et al. |
| 7,028,158 | B1 * | 4/2006 | Beatty et al. ................ 711/202 |
| 7,089,395 | B2 * | 8/2006 | Jacobson et al. ............ 711/202 |
| 7,149,866 | B2 | 12/2006 | Blandy |
| 2003/0050729 | A1 | 3/2003 | Basham et al. |
| 2003/0126132 | A1 | 7/2003 | Kavuri et al. |
| 2004/0044827 | A1 | 3/2004 | Carlson et al. |

* cited by examiner

*Primary Examiner*—Sanjiv Shah
*Assistant Examiner*—Zhuo H Li
(74) *Attorney, Agent, or Firm*—Blakely, Sokoloff, Taylor & Zafman LLP (57) ABSTRACT

The reserves of a flexible volume and the aggregate which contains the flexible volume are "stacked". When the flexible volume is created, a portion of the flexible volume having a capacity equal to or less than an unreserved portion of the flexible volume is guaranteed by the aggregate. When the flexible volume creates or modifies metadata, the flexible volume issues a request to the aggregate. The aggregate then issues a portion of the reserve of the aggregate to the flexible volume for storing the metadata.

19 Claims, 7 Drawing Sheets

RESERVE STACKING

RELATED APPLICATIONS

This application is related to U.S. patent application Ser. No. 11/101,909, filed on Apr. 8, 2005 and entitled, "Capacity Guarantees in a Storage System," by E. Hamilton et al., which is incorporated herein by reference.

FIELD OF THE INVENTION

The invention generally relates to data storage technology and, more specifically, to stacking reserved storage space of flexible volumes.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In conventional file servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (or is contained within) an aggregate, and which is managed as a single administrative unit, such as a single file system.

In conventional file servers there is a fixed, one-to-one relationship between a volume and its containing aggregate, i.e., each volume is exactly coextensive with one aggregate. Consequently, there is a fixed relationship between each volume and the disks that are associated with it. This fixed relationship means that each volume has exclusive control over the disks that are associated with the volume. Only the volume associated with the disk can read and/or write to the disk. Unused space within the disks associated with the volume cannot be used by another volume. Thus, even if a volume is only using a fraction of the space on its associated disks, the unused space is reserved for the exclusive use of the volume.

To overcome these limitations and other limitations of traditional volumes, a technology called flexible volumes has been developed by NetApp® and is now available in NetApp® Filers as a feature of the Data ONTAP™ storage operating system. A flexible volume is analogous to a traditional volume, in that it is managed as a file system, but unlike a traditional volume, it is treated separately from the underlying physical storage that contains the associated data. A "flexible volume" is, therefore, a set of stored data associated with one or more mass storage devices, such as disks, which obtains its storage from an aggregate, and which is managed as a single administrative unit, such as a single file system, but which is flexibly associated with the underlying physical storage.

Flexible volumes allow the boundaries between aggregates and volumes to be flexible, such that there does not have to be a one-to-one relationship between a flexible volume and an aggregate. An aggregate can contain multiple flexible volumes. Hence, flexible volumes can be very flexibly associated with the underlying physical storage block characteristics. Further, to help reduce the amount of wasted storage space, any free data block in an aggregate can be used by any flexible volume in the aggregate. A flexible volume can be grown or shrunk in size. Furthermore, blocks can be committed to flexible volumes on-the-fly from available storage.

While the advantages of flexible volume technology are apparent, this technology also creates certain challenges in certain areas. One such area relates to managing storage space that is reserved for special purposes, such as for storing metadata.

A volume may comprise storage in the form of discrete physical storage units such as blocks. A volume stores both user data and metadata. User data is any data generated by users of the volume that typically includes data files, application files, etc. User data is the data that is visible to a user in the volume's directory structure. Metadata is data stored by standard volumes and flexible volumes that is used to administer the user data in the volume. In general, metadata is any data stored by the volume that is not user data. Examples of metadata include tree structures describing the location of blocks corresponding to certain files in the volume, a system inode file, directory structures, etc.

Each volume includes a certain amount of reserved space (e.g., 10%) that is not reported to the user as available for storing user data. The reserved space may include space used to store metadata, as well as free space on the drives that allows more efficient operation. In one possible approach, the aggregate itself also includes reserved space, in addition to the reserves of each of the volumes stored within the aggregate. For example, if a 10% reserve is used, an aggregate totaling 1000 GB will report only 900 GB as available; the rest is reserved. Further, each time a flexible volume is created within the aggregate, 10% of the flexible volume's storage is reserved. For example, if a 100 GB flexible volume is created, only 90 GB are reported available.

Thus, in this approach, at least two reserves are created, one for the aggregate and one for each flexible volume. This approach unnecessarily duplicates at least some of the required reserve space between the aggregate and the flexible volumes within the aggregate, thereby reducing the amount of available storage available to users. What is needed, therefore, is a way to reduce the amount of reserve space used when implementing flexible volumes.

SUMMARY OF THE INVENTION

The present invention includes methods and apparatuses for reserve stacking. According to one embodiment, a flexible volume is maintained within an aggregate of storage; and a reserved space of the flexible volume is stacked with a reserve space of the aggregate.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein is a technique for reserve stacking in a storage system. Note that in this description, references to "one embodiment" or "an embodiment" mean that the feature being referred to is included in at least one embodiment of the present invention. However, such references do not necessarily all refer to the same embodiment.

According to an embodiment of the invention, when a flexible volume is created, a portion of the flexible volume having a capacity equal to or less than an unreserved portion of the flexible volume is "guaranteed" by the aggregate. A process of guaranteeing storage space is described below. When the flexible volume creates or modifies metadata, or performs any other operation that would normally store data in the reserved portion of the volume, the flexible volume issues a request to the aggregate. The aggregate responds by granting a portion of the reserve of the aggregate to the flexible volume, for storing the metadata of the flexible volume or other use. With this approach, the storage space for metadata of a flexible volume is never directly charged (attributed) to the flexible volume itself; instead, it is charged to the aggregate.

In this way, the reserve of the flexible volume and the reserve of the aggregate are shared, or "stacked", and the amount of reserve space required is kept low. Reserve "stacking", therefore, refers to using the reserve of an aggregate to fulfill the duties of the reserve(s) of one or more flexible volumes contained within the aggregate. This approach is illustrated conceptually in FIG. 1A.

Figure 1A:
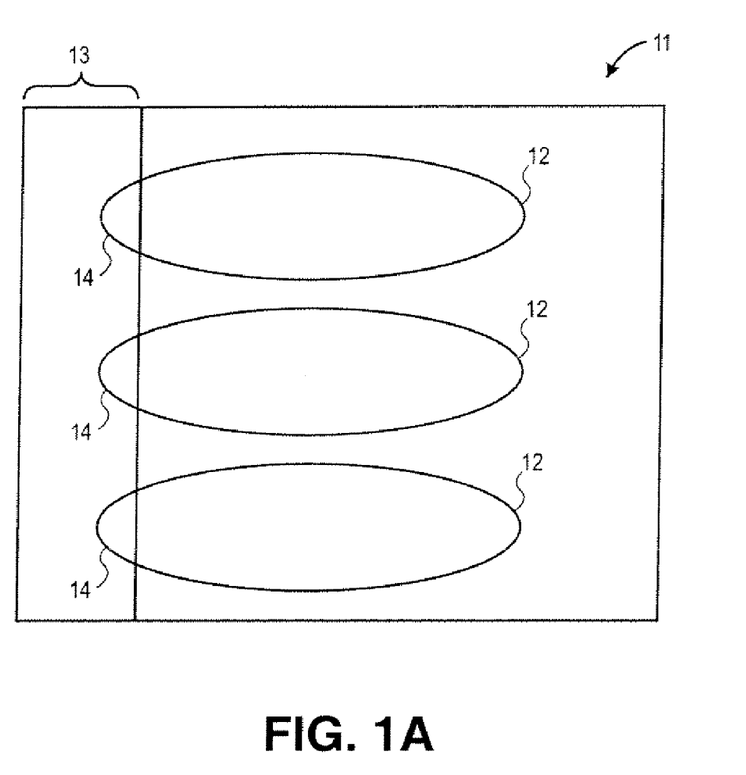
FIG. 1A conceptually illustrates an aggregate and flexible volumes with stacked reserves.

FIG. 1A shows an aggregate 11 that contains multiple flexible volumes 12. The aggregate 11 has a reserved portion 13. Each of the flexible volumes 12 also has a reserved portion 14, which is actually provided by the reserved portion 13 of the aggregate 11. Thus, the reserves 13 of the aggregate 11 and the reserves 14 of the flexible volumes 12 are shared, or "stacked".

Figure 1B:
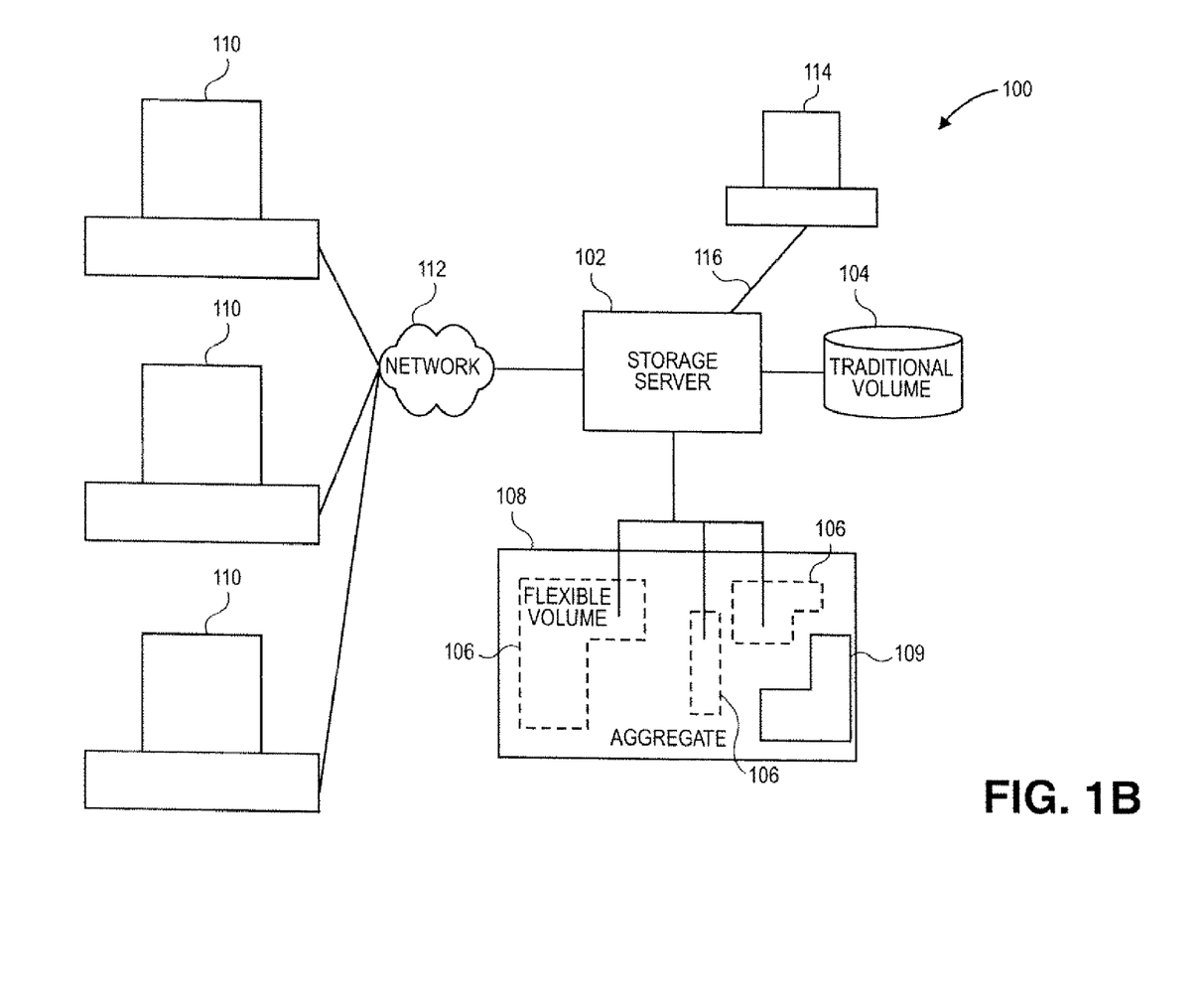
FIG. 1B illustrates a data storage device managing a volume and a flexible volume.

FIG. 1B illustrates a storage server 102 managing a volume and a flexible volume. The storage network 100 includes a storage server 102, that manages a traditional volume 104 and a flexible volume 106. The storage server 102 may be, for example, a NAS-based server (e.g., a filer), a SAN-based server, or a hybrid storage server that can be used in a NAS context or a SAN context. The traditional volume 104 is a volume that is physically mapped to a drive or group of drives. For example, the traditional volume 104 may be a ten gigabyte (GB) volume stored on one ten GB hard drive. The traditional volume 104 has a fixed size and may not expand if available space on the drive on which it is located is exhausted.

The flexible volume 106 is a logical construct formed from an aggregate 108 of storage. The aggregate 108, as will be discussed below, may contain multiple RAID groups including multiple drives. The aggregate 108 is a pool of storage which more than one storage server may access to establish flexible volumes. The aggregate includes a reserve 109 that can be used to store metadata and to improve system efficiency. The reserve 109 may, for example, include 10% of the capacity of the aggregate 108, where the remaining 90% of the blocks of the aggregate are the unreserved blocks and are reported to a user as available storage.

Figure 1C:
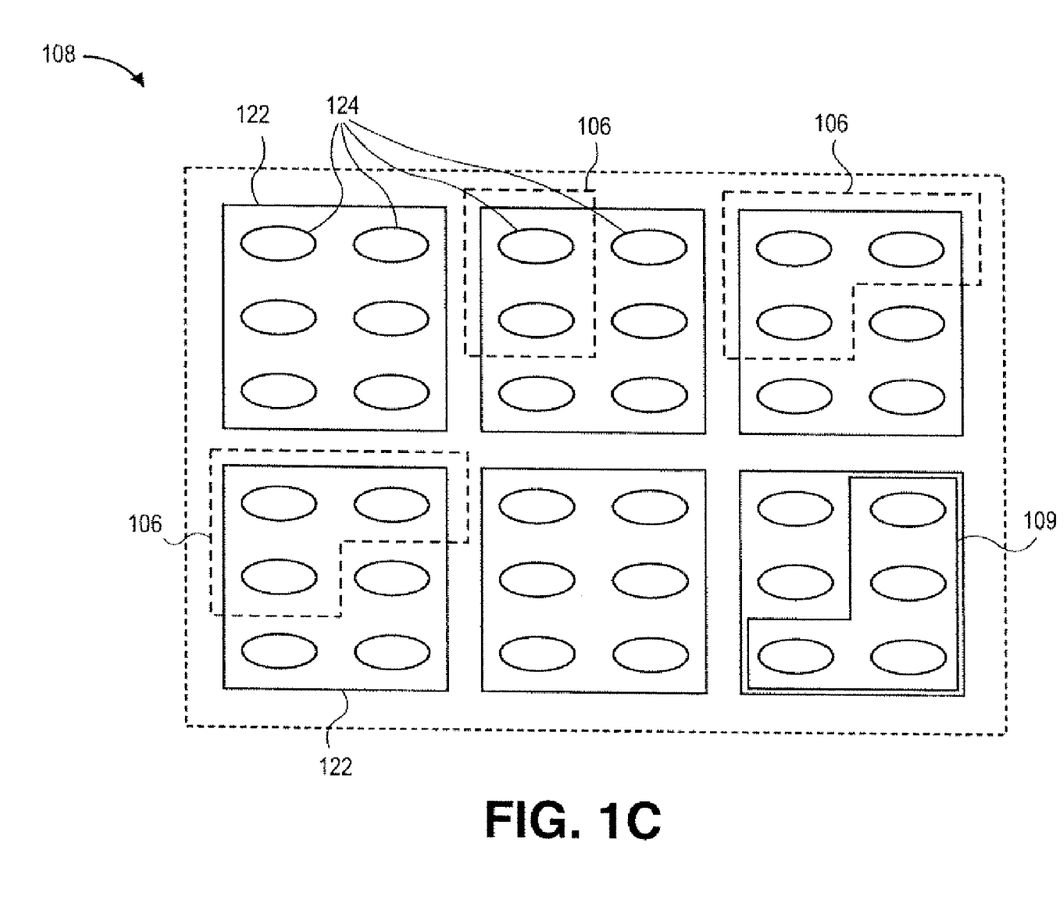
FIG. 1C illustrates an aggregate and a flexible volume.

According to one embodiment, the aggregate 108 stores data in a block format. For example, the aggregate 108 may comprise many four-kilobyte (KB) blocks on one or more physical drives. When the storage server 102 writes data to the flexible volume 106, the aggregate 108 assigns the most convenient block(s) to the flexible volume 106. The new block(s) assigned to the flexible volume 106 may not necessarily be physically or logically proximate to the currently written blocks in the flexible volume 106, as is shown in FIG. 1C. Instead, the aggregate 108 may assign the most conveniently accessible block(s), such as those closest to the current position of the write heads of the drive(s) of the aggregate 108, to the flexible volume 106.

A client 110, such as a terminal or personal computer, may access the storage server 102 through a network 112 to access data stored in and to write data to the flexible volume 106. The network 112 may be, for example, a local area network (LAN), a wide area network (WAN), a metropolitan area network (MAN), a global network such as the Internet, or other type of network or a combination of networks. The client 110 may be a remote personal computer (PC), workstation, server or other processing system that stores data in the flexible volume 106 or the traditional volume 104. Multiple clients 110 may access the storage server 102. A local client 114 may also access the storage server 102 using a serial cable 116 or other connection.

The reserve 109 may be used to store many different types of metadata. Metadata generally refers to data used to administer a volume and typically includes any data stored in blocks of a volume that is not user data. Metadata may include files such as map and inode files that describe the physical location of data stored in logical structures such as files, files that describe the type of data stored in each block of the volume, and other files or data that describe the volume. In addition to storing metadata, the reserve 109 may also include free blocks that improve drive efficiency by allowing for improved block relocation.

FIG. 1C illustrates the aggregate 108 and the flexible volume 106. The aggregate 108 includes six RAID groups 122. Each illustrated RAID group 122 includes six physical drives 124, e.g., six ten GB disks. The flexible volume 106 has been established (created) within the aggregate 108. When the flexible volume 106 is established, it has a volume size and a space guarantee. The volume size is the total size of the volume. For example, the flexible volume 106 may be established with a volume size of 95 GB. The volume size includes all of the reserved and unreserved capacity of the flexible volume. However, as mentioned above, the flexible volume 106 is dynamically expandable.

The guarantee is the amount of storage that the aggregate 108 guarantees will be available to the flexible volume 106. The guarantee may be less than the volume size, depending on the type of guarantee. Since multiple flexible volumes can be written to a single aggregate, and flexible volumes can be established in any size and can be dynamically enlarged, guarantees are used to ensure that flexible volumes have the needed storage available to them. A technique for generating and processing volume capacity guarantees is described in U.S. patent application Ser. No. 11/101,909, filed on Apr. 8, 2005 and entitled, "Capacity Guarantees in a Storage System," by E. C. Hamilton et al., which is incorporated herein by reference.

According to one embodiment of the invention, when a flexible volume is created in the aggregate 108, a guarantee the size of the unreserved portion of the flexible volume (or smaller) is issued to the flexible volume. As will be described below, different types of guarantees may be issued to a flexible volume. In order to use the reserve of the aggregate 108, the flexible volume will not request a guarantee for its reserved portion. For example, if a flexible volume of 100 GB is to be created, a 10% reserve is used, and the entire flexible volume is to be guaranteed, only 90 GB of the aggregate would be guaranteed to the flexible volume.

The flexible volume 108 may occupy less than an entire physical drive 124. Another flexible volume may use the unused space on a drive 124 partially occupied by the flexible volume 108. Further, the flexible volume 108 is not necessarily located on only eight of the drives 124. The aggregate 108 may partition the data stored in the flexible volume 108 to any number of disks, as is convenient or necessary.

According to an embodiment of the invention, three types of guarantees may be established. A "full volume" guarantee is requested when a storage server wants to ensure that the entire capacity of a flexible volume will be guaranteed by the aggregate 108. A "none" guarantee is requested when no guarantee is wanted. An "object" guarantee guarantees the space occupied by a specific file or other object found within the flexible volume.

As discussed further below regarding FIG. 5, the aggregate 108 tracks the remaining amount of the guarantee for each active flexible volume, and the total available space in the aggregate 108 that is otherwise not guaranteed. When the aggregate 108 issues a guarantee, the amount of available space is reduced by the size of the guarantee. When using the full volume guarantee, if a storage server 102 writes to a flexible volume 106, the size of the guarantee for the flexible volume 106 is likewise reduced. With the object guarantee, the storage server 102 asking to establish the flexible volume 106 requests a guarantee of a specific size for the object being protected. If the object is modified or written to, the size of the guarantee is reduced.

For example, the flexible volume 106 may have 80 GB of data currently written to it. The flexible volume 106 may have a full volume guarantee that was originally established for 95 GB. Since 80 GB have been written to the flexible volume 106, the guarantee has been reduced by 80 GB and now only 15 GB is guaranteed to the flexible volume 106. The storage server 102 may write to 15 GB of the aggregate 108 before the guarantee is exhausted. Once the guarantee is exhausted, the storage server 102 may request a new guarantee to expand the flexible volume 106. If there is sufficient available space in the aggregate 108, the aggregate 108 will normally extend the guarantee.

As another example, the aggregate 108 may have 1000 GB of total storage space, where 95 GB is both written to and guaranteed to the flexible volume 106. In this case, the aggregate 108 would have 905 GB of available space, even though only 80 GB of data are written to the aggregate 108. If another flexible volume having a full volume guarantee of 100 GB were established in the aggregate 108, the amount of available space would be reduced to 805 GB, even before any data were written to the new flexible volume. By reducing the amount of available space by the amount of outstanding guarantees, the aggregate 108 ensures that the guarantees can be fulfilled.

Reserve "stacking" refers to using the reserve of the aggregate 108 to fulfill the duties of the reserve of the flexible volume 106. When a storage server makes a request to establish a flexible volume, the size requested for the flexible volume includes the necessary space to create a reserve for the flexible volume. In order to perform reserve stacking, the guarantee requested by the storage server does not exceed the unreserved capacity of the flexible volume. When metadata needs to be written, the aggregate 108 writes the metadata to the aggregate's reserve 109. In this way, redundant reserves are eliminated.

Figure 2:
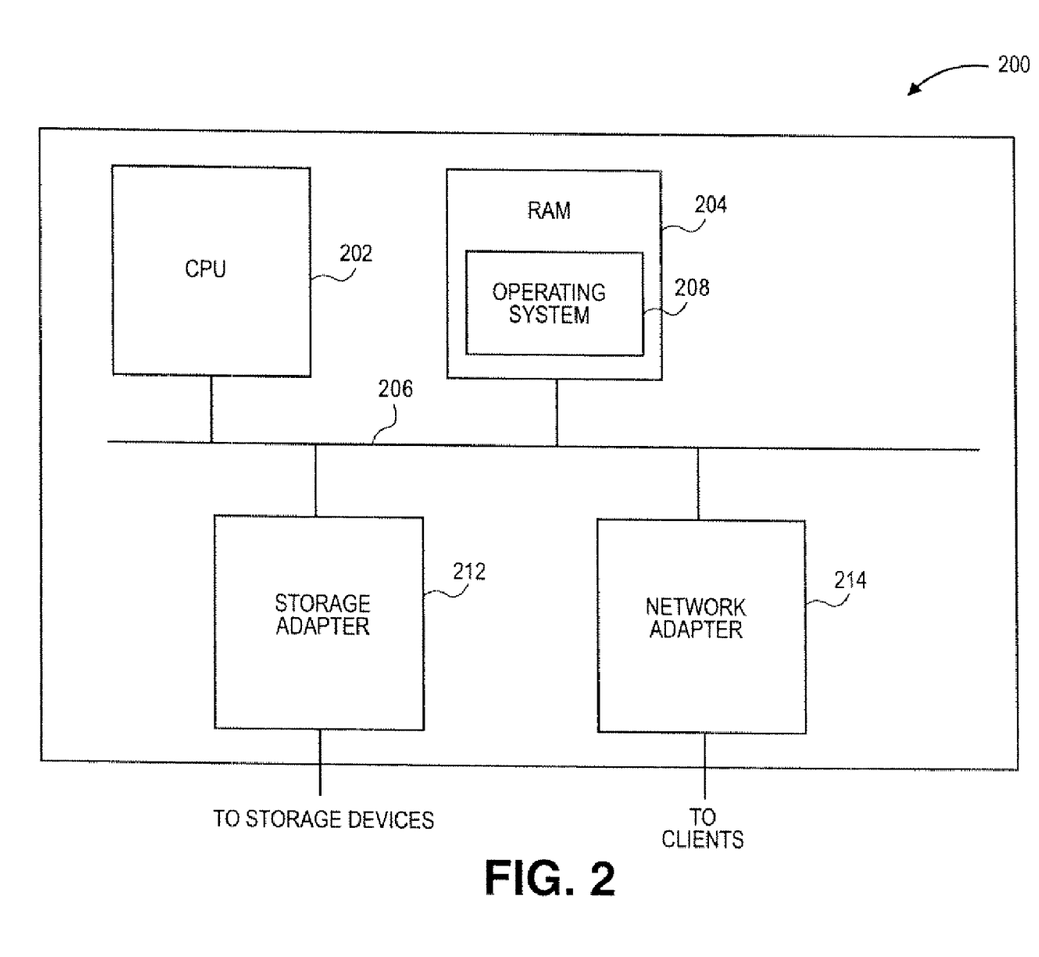
FIG. 2 shows the architecture of a storage server according to certain embodiments of the invention.

FIG. 2 shows the architecture of a storage server 200, representative of the storage server 102, which may be a filer and/or a block-based storage server, according to certain embodiments of the invention. Note that certain standard and well-known components which are not germane to the present invention are not shown. The storage server 200 includes a processor 202 and main memory 204, coupled together by a bus system 206. The bus system 206 in FIG. 2 is an abstraction that represents any one or more separate physical buses and/or point-to-point connections, connected by appropriate bridges, adapters and/or controllers. The bus system 206, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 202 is the central processing unit (CPU) of the storage server 200 and, thus, controls the overall operation of the storage server 200. In certain embodiments, the processor 202 accomplishes this by executing software stored in main memory 204. The processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 204, which is generally some form of random access memory (RAM), stores at least a portion of the operating system 208 of the storage server 200. Techniques of the present invention may be implemented within the operating system 208, as described further below. The operating system 208 may be, for example, the Data ONTAP® operating system by NetApp®. Also connected to the processor 202 through the bus system 206 are a storage adapter 212, and a network adapter 214. The storage adapter 212 allows the storage server 200 to access the external mass storage devices including the aggregate 108, and may be, for example, a Fibre Channel (FC) adapter or SCSI adapter. The network adapter 214 may include an Infiniband, FC, Ethernet, or other adapter, and may provide a connection allowing remote clients to communicate with the storage server 200.

Figure 3:
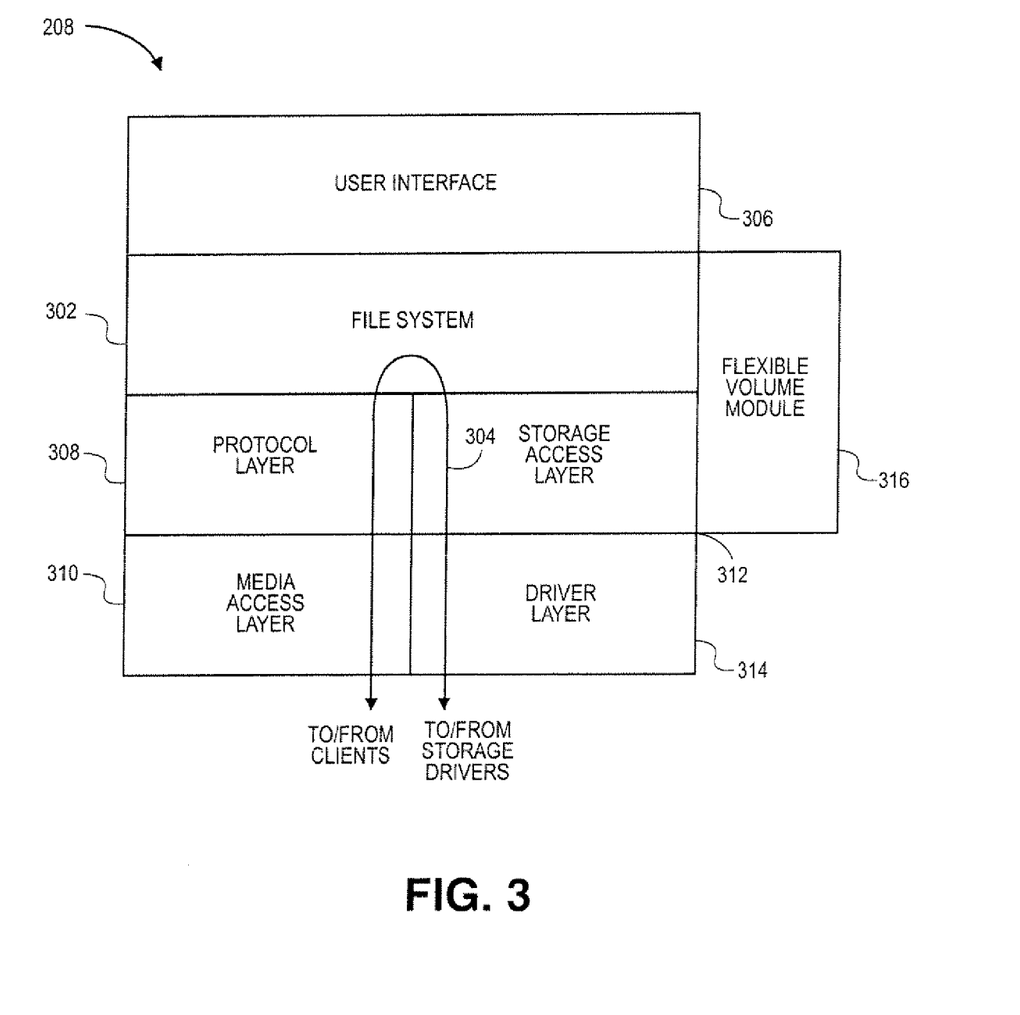
FIG. 3 illustrates an operating system of a storage server, according to certain embodiments of the invention.

FIG. 3 illustrates the operating system 208 of the storage server 200, according to certain embodiments of the invention. As can be seen, the operating system 208 includes a number of layers. The core of the operating system 208 is the file system 302. The file system 302 is a programmatic entity that imposes structure on an address space of one or more physical or virtual storage devices, such as disks, so that the operating system 208 may conveniently read and write data containers, such as files and blocks, and related metadata. The file system 302, among other responsibilities, executes read and write operations on the mass storage devices in response to client requests, maintains directories, and manages consistency point operations. An example of the file system 302 suitable for this purpose is the Write Anywhere File Layout to (WAFL®) file system from Network Appliance, such as used in the NetApp® Filers. Also shown in FIG. 3 is the logical data path 304 from clients to mass storage devices, through the file system 302.

The operating system 208 also includes a user interface 306, through which a network administrator or other user can control and/or configure the storage server 200 of FIG. 2 (e.g., remotely from a management station). The user interface 306 may generate a command line interface and/or a graphical user interface for this purpose.

The client side of the operating system 208 includes a protocol layer 308 and, at the lowest level, a media access layer 310. The protocol layer 308 implements any of various protocols used to communicate with client devices, such as network file system (NFS), common Internet file system (CIFS), Internet protocol (IP) and/or hypertext transport protocol (HTTP). The media access layer 310 includes one or more drivers which implement the protocols used to communicate over the network, such as Ethernet, Fiber Channel or Internet SCSI (iSCSI).

On the storage device side, the operating system 208 includes a storage access layer 312 and, at the lowest level, a storage driver layer 314. The storage access layer 312 implements a disk storage protocol such as RAID, while the storage driver layer 314 implements a lower-level storage device access protocol, such as Fibre Channel or SCSI.

The reserve stacking functionality and other functionality described herein may be implemented in a flexible volume module 316. Whereas the file system 302 is responsible for creating and managing traditional volumes, the flexible volume module 316 performs all of the basic functions related to creating and managing flexible volumes. For example, the flexible volume module 316 tracks the amount of guarantees available to various flexible volumes. The flexible volume module 316 may also manage the location of data stored in the flexible volumes managed by the storage server 102. The flexible volume module 316 may be an extension of the storage access layer 314 and the file system 302, as shown. Alternatively, the flexible volume module 316 may be an integral part of the storage access layer 314 or the file system 302, or a separate layer logically between the storage access layer 314 and the file system 302.

Figure 4:
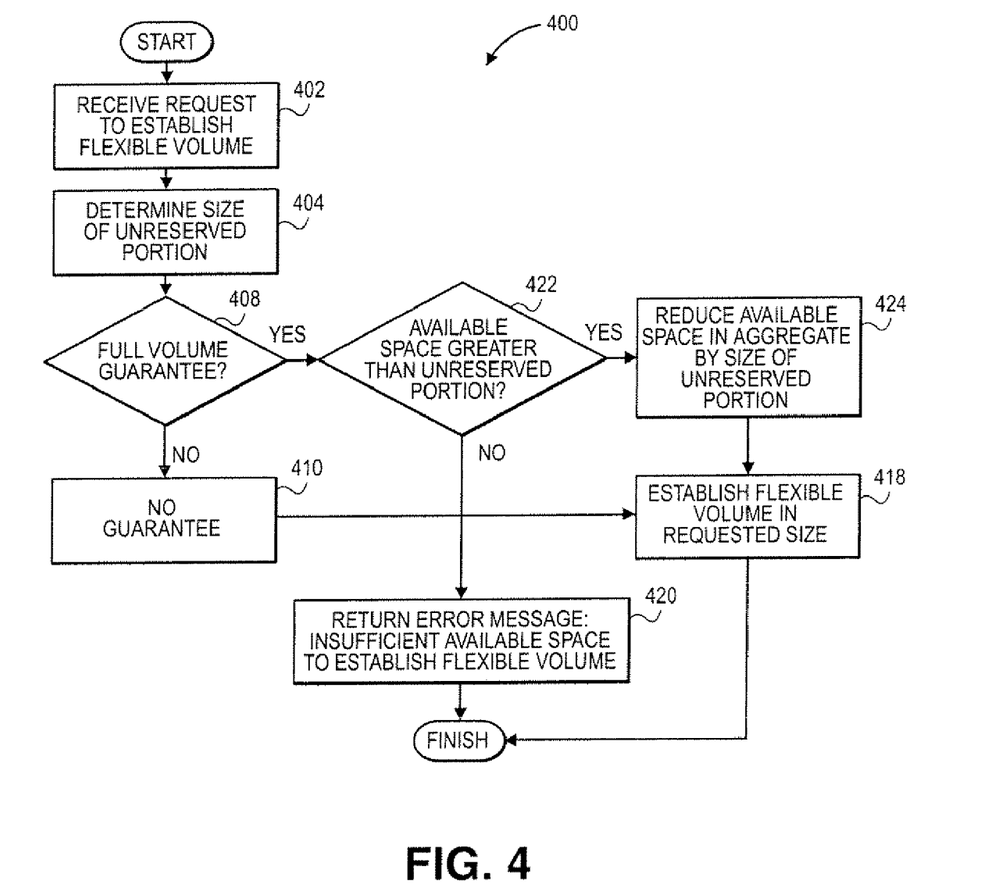
FIG. 4 is a flowchart describing a process for establishing a flexible volume using storage guarantees and stacking the reserves of the aggregate and the flexible volume.

FIG. 4 is a flowchart describing a process that may be performed by a storage server, such as storage server 102 or 200, to create a flexible volume using storage guarantees and stacking the reserves of the aggregate and flexible volume. The process 400 includes receiving a request to establish a flexible volume, determining whether the requested flexible volume can be established based on the type of guarantee requested, adjusting the guarantee if needed to allow for reserve stacking, and establishing the flexible volume if possible.

In block 402, a request is received by the aggregate to establish a flexible volume. The request to establish the flexible volume includes the size of the volume and the type of guarantee requested. The request also includes the amount of the flexible volume which is to be reserved. The amount may be a percentage or a specific amount of the flexible volume.

In block 404, the size of the unreserved portion of the flexible volume is determined. For example, if a 100 GB flexible volume with a 10% reserve is requested, the unreserved portion is 90 GB. If a full volume guarantee has been requested, the guarantee will be for 90 GB. Additionally, if an object guarantee has been requested, since the unreserved space (i.e., the space available for user data) is 90 GB, the size of the object guarantee cannot exceed 90 GB.

In block 408 it is determined whether a full volume guarantee has been requested. If the guarantee is not a full volume guarantee, then at block 410 it is determined that there has been no guarantee requested for the flexible volume. If no guarantee has been requested, there is no need to determine whether there is sufficient available space for the requested flexible volume. As a result, the process 400 immediately proceeds to block 418, where the requested flexible volume is established.

In block 408, if a full volume guarantee has been requested, then in block 422 it is determined whether the available space in the aggregate is greater than the unreserved portion of the requested size of the flexible volume. In this way, only the unreserved portion of the flexible volume is guaranteed, and the reserve for the flexible volume is "stacked" with the reserve of the aggregate 108. The full volume guarantee guarantees that the entire unreserved capacity of the requested flexible volume will be available in the aggregate. As a result, the aggregate must have available space equal to at least the size of the unreserved portion of the flexible volume. If the aggregate does not have sufficient available space, then in block 420 an error message is returned. If there is sufficient available space for the flexible volume, in block 424, the amount of available space in the aggregate is reduced by the requested size of the flexible volume. By doing this, the aggregate will not allocate the space required by the flexible volume. After reducing the amount of available space, in block 418, the flexible volume is established.

Figure 5:
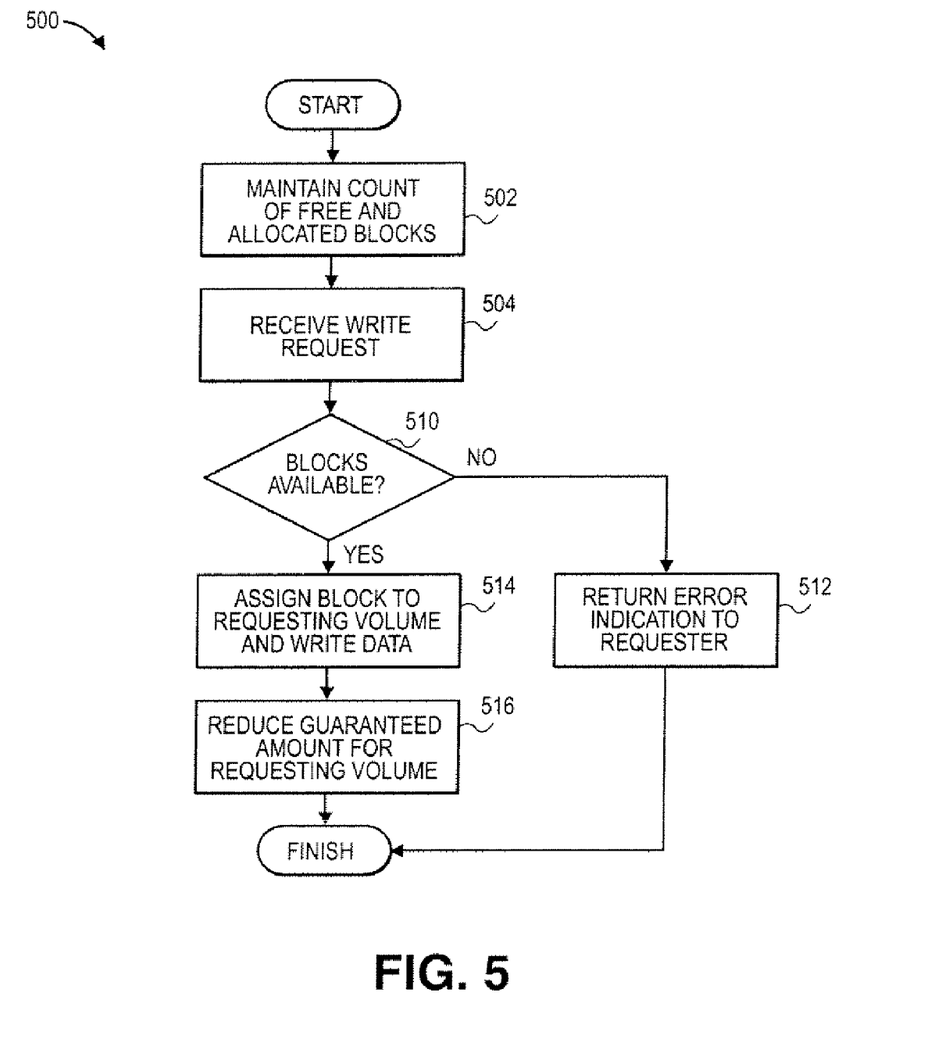
FIG. 5 is a flowchart describing a process for accounting for available and allocated blocks in an aggregate.

FIG. 5 is a flowchart describing a process 500 that may be performed by a storage server, such as storage server 102 or 200, to account for available and allocated blocks in an aggregate. The aggregate maintains a total of available blocks (or other storage units) available. This total reflects the number of blocks that are not written to and not guaranteed to a flexible volume. This total was used by the process 400 (in blocks 414 and 422) to determine whether a requested flexible volume could be established in the aggregate.

In block 502, an initial count of available and allocated blocks is determined. The initial count determines the total number of unwritten blocks minus the total number of guaranteed blocks in the aggregate. As shown above, in blocks 414 and 422, when a guarantee is made, the number of available blocks in the aggregate is reduced to reflect the guarantee. The initial count determines the total size of guarantees that can be made to flexible volumes.

In block 504, a write request is received from a storage server or other device managing a flexible volume. The aggregate also tracks the individual guarantees for each flexible volume. The aggregate knows how many blocks are guaranteed to each flexible volume and can use this knowledge to determine whether a write should be allowed.

Therefore, the aggregate next determines in block 510 whether a sufficient number of blocks are available to satisfy the request. If there is not a sufficient number of blocks, then in block 512 an error indication is returned to the requester. If there is a sufficient number of blocks available for the write request, then in block 514 available block(s) are assigned to the requesting volume, and the data in the write request is written to the assigned blocks. In block 516, the guaranteed amount for the flexible volume making the write request is reduced by the size of the write request. In some cases (e.g., when using the object guarantee), the size of the write request may be greater than the size of the guarantee. If the size of the write request exceeds the size of the guarantee for the flexible volume, the size of the guarantee is reduced to zero.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method comprising:
   maintaining a flexible volume within an aggregate of storage;
   stacking a reserved portion of the flexible volume with a reserved portion of the aggregate, wherein at least some of the reserved portion of the aggregate acts as the reserved portion of the flexible volume;
   creating the flexible volume to have a size;
   guaranteeing a portion of the flexible volume to have a size less than the size of the flexible volume, the guaranteeing comprising:
      determining an amount of available space in the aggregate;
      determining a type of guarantee for the flexible volume;
      determining the size of the guaranteed portion of the flexible volume based on the type of guarantee and the size of an unreserved portion of the flexible volume; and
      if the size of the guaranteed portion of the flexible volume is greater than the available space in the aggregate, returning an error message;
   receiving a request to write metadata for the flexible volume; and
   in response to the request, writing the metadata to the reserved portion of the aggregate.

2. The method of claim 1, further comprising:
   receiving a request to write data other than metadata to the flexible volume, the data having a size; and
   reducing the guaranteed portion of the flexible volume by the size of the data.

3. The method of claim 2, wherein the size of the guaranteed portion of the flexible volume is equal to the size of an unreserved portion of the flexible volume.

4. The method of claim 2, wherein the size of the guaranteed portion of the flexible volume is less than the size of an unreserved portion of the flexible volume.

5. The method of claim 2, further comprising writing the data other than metadata to an unreserved portion of the aggregate.

6. The method of claim 1, wherein determining the size of the guaranteed portion of the aggregate comprises:
   if the type of guarantee is a full volume guarantee, determining that the size of the guaranteed portion of the aggregate is equal to the size of the unreserved portion of the flexible volume.

7. The method of claim 1, wherein determining the size of the guaranteed portion of the aggregate comprises:
   if the type of guarantee is an object guarantee, determining that the size of the guaranteed portion of the aggregate is equal to a size of an object of the flexible volume.

8. A storage server comprising:
   a communication adapter through which to communicate with a plurality of clients over a network;
   a storage adapter through which to access a plurality of mass storage devices in response to data access requests from the clients, the plurality of mass storage devices collectively providing an aggregate of storage;
   a processor to
      establish a flexible volume within the aggregate, the flexible volume having a size;
      guarantee a portion of the flexible volume, the portion having a size less than the size of the flexible volume, the guaranteeing comprising:
         determining an available space in the aggregate;
         determining a type of guarantee for the flexible volume;
         determining the size of the guaranteed portion of the flexible volume based on the type of guarantee and the size of an unreserved portion of the flexible volume; and
         if the size of the guaranteed portion of the flexible volume is greater than the available space in the aggregate returning an error message;
      receive a request to write metadata for the flexible volume; and
      write the metadata to a reserved portion of the aggregate, wherein the reserved portion of the aggregate acts as a reserved portion of the flexible volume;
      receive a request to write data other than metadata to the flexible volume; and
      reduce a guaranteed portion of the flexible volume by a size of the data, wherein the size of the guaranteed portion of the aggregate is equal to the size of an unreserved portion of the flexible volume.

9. The storage server of claim 8, wherein the size of the guaranteed portion of the aggregate is less than the size of an unreserved portion of the flexible volume.

10. The storage server of claim 8, wherein the processor is further to:
    write the data other than metadata to an unreserved portion of the aggregate.

11. The storage server of claim 8, wherein determining the size of the guaranteed portion of the flexible volume comprises:
    if the type of guarantee is a full volume guarantee, determining that the size of the guaranteed portion of the flexible volume is equal to the size of the unreserved portion.

12. The storage server of claim 8, wherein determining the size of the guaranteed portion of the flexible volume comprises:
    if the type of guarantee is an object guarantee, determining that the size of the guaranteed portion of the flexible volume is equal to the size of an object of the flexible volume.

13. A machine-readable storage medium storing instructions which, when executed by a processor, cause the processor to perform a method that comprises:

establishing a flexible volume within an aggregate of storage, the aggregate having a reserved portion and the flexible volume having a size;

guaranteeing a portion of the flexible volume to have a size less than the size of the flexible volume, the guaranteeing comprising:
- determining an amount of available space in the aggregate;
- determining a type of guarantee for the flexible volume;
- determining the size of the guaranteed portion of the flexible volume based on the type of guarantee and a size of an unreserved portion of the flexible volume; and
- if the size of the guaranteed portion of the flexible volume is greater than the available space in the aggregate, returning an error message; and using at least some of the reserved portion of the aggregate to act as a reserved portion of the flexible volume.

14. The machine-readable storage medium of claim 13, the method further comprising:
- receiving a request to write metadata for the flexible volume; and
- in response to the request, writing the metadata to the reserved portion of the aggregate.

15. The machine-readable storage medium of claim 14, the method further comprising:
- receiving a request to write data other than metadata to the flexible volume, the data having a size; and
- reducing the guaranteed portion of the flexible volume by the size of the data.

16. The machine-readable storage medium of claim 15, the method further comprising writing the data other than metadata to an unreserved portion of the aggregate.

17. The method of claim 1, wherein the type of guarantee is one of the following: a full volume guarantee ensuring that an entire capacity of the flexible volume is guaranteed, a none guarantee that does not ensure any capacity, and an object guarantee ensuring that a space occupied by a specific file is guaranteed.

18. The storage server of claim 8, wherein the type of guarantee is one of the following: a full volume guarantee ensuring that an entire capacity of the flexible volume is guaranteed, a none guarantee that does not ensure any capacity, and an object guarantee ensuring that a space occupied by a specific file is guaranteed.

19. The machine-readable storage medium of claim 13, wherein the type of guarantee is one of the following: a full volume guarantee ensuring that an entire capacity of the flexible volume is guaranteed, a none guarantee that does not ensure any capacity, and an object guarantee ensuring that a space occupied by a specific file is guaranteed.

* * * * *